(12) United States Patent
Di Benedetto

(10) Patent No.: US 7,854,068 B2
(45) Date of Patent: Dec. 21, 2010

(54) NUMERIC CONTROL ENGRAVING MACHINE

(76) Inventor: Leonardo Luis Di Benedetto, President Serra, 23, E-08232, Viladecavalls (Barcelona) (ES)

( * ) Notice: Subject to any disclaimer, the term of this patent is extended or adjusted under 35 U.S.C. 154(b) by 191 days.

(21) Appl. No.: 11/886,454

(22) PCT Filed: Mar. 15, 2006

(86) PCT No.: PCT/ES2006/000126
§ 371 (c)(1), (2), (4) Date: Jan. 14, 2009

(87) PCT Pub. No.: WO2006/097560
PCT Pub. Date: Sep. 21, 2006

(65) Prior Publication Data
US 2009/0234491 A1    Sep. 17, 2009

(30) Foreign Application Priority Data
Mar. 15, 2005    (ES) ................................ 200500596

(51) Int. Cl.
*B43L 13/00* (2006.01)
*B23C 1/12* (2006.01)
(52) U.S. Cl. ........................................ 33/18.1; 33/24.1
(58) Field of Classification Search ............... 33/18.1, 33/21.1, 24.1, 24.3, 503
See application file for complete search history.

(56) References Cited

U.S. PATENT DOCUMENTS

| | | | |
|---|---|---|---|
| 3,827,334 A | 8/1974 | English et al. | |
| 3,857,025 A | 12/1974 | English et al. | |
| 3,975,983 A | 8/1976 | Stockman | |
| 3,975,985 A | 8/1976 | Stockman | |

(Continued)

FOREIGN PATENT DOCUMENTS

EP    0 890 890    1/1999

(Continued)

OTHER PUBLICATIONS

International Search Report issued Jun. 7, 2006 in the International (PCT) Application of which the present application is the U.S. National Stage.

*Primary Examiner*—G. Bradley Bennett
(74) *Attorney, Agent, or Firm*—Wenderoth, Lind & Ponack, L.L.P.

(57) ABSTRACT

The invention relates to a numeric control engraving machine which can be used to engrave different objects such as gems, plates of metal or another material, such as to produce the effect obtained by means of artisan engraving with a chisel, in which the tradesperson performs a downward/upward movement with the chisel with each insertion made in the surface of the body to be engraved, such that the engraved line has a curvilinear trajectory. In addition to the three axes (X, Y, Z) or degrees of freedom for the movement of the tool holder, the inventive engraving machine also creates two complementary axes which are denoted as PT (depth of line) and SV (vector tracing), thereby producing the same type of engraving as that obtained by a tradesperson with a chisel. The PT axis controls the penetration movement of the tool for the curvilinear line over the course of the vector that defines the direction and sense of the line. The SV (vector tracing) axis orients the cutting edge of the tool with the correct engraving angle.

9 Claims, 5 Drawing Sheets

U.S. PATENT DOCUMENTS

| | | |
|---|---|---|
| 4,036,107 A | 7/1977 | Constantine |
| 5,115,569 A * | 5/1992 | Kubo .......................... 33/1 M |
| 6,295,737 B2 * | 10/2001 | Patton et al. ................. 33/18.1 |
| 6,430,462 B1 | 8/2002 | Lübcke et al. |
| 6,459,952 B1 | 10/2002 | Dundorf |
| 2001/0003871 A1 * | 6/2001 | Patton et al. ................. 33/18.1 |
| 2002/0053371 A1 | 5/2002 | Pikna |
| 2005/0055128 A1 | 3/2005 | Hirai et al. |
| 2007/0180715 A1 * | 8/2007 | Nishio ........................ 33/18.1 |
| 2009/0094844 A1 * | 4/2009 | Shenderovich et al. ....... 33/18.1 |

FOREIGN PATENT DOCUMENTS

| | | |
|---|---|---|
| ES | 2 216 491 | 10/2004 |
| WO | 94/27198 | 11/1994 |
| WO | 98/16340 | 4/1998 |

* cited by examiner

NUMERIC CONTROL ENGRAVING MACHINE

OBJECT OF THE INVENTION

As stated in the title of this specification, the object of this invention relates to a numeric control engraving machine which can be used to engrave different objects such as jewels, plates of metal or other material, with an engraving effect similar to that produced by artisan engraving with a chisel.

When carrying out engraving with a chisel, the craftsman performs an upward/downward movement of the chisel in each incision made on the surface of the body to engrave. The engraved line presents an open curvilinear or polygonal trajectory that has zero depth at the origin, maximum at a certain point of the line and then zero again at the end.

PRIOR ART OF THE INVENTION

Manual and numeric control engraving machines can currently be found on the market. Among the latter, the usual ones are those known as two, two and a half and three axis, with the three axis type being the most advanced. In the case of the X, Y axes, these can consist of two linear axes or one linear axis and another radial one.

Engraving machines comprise a main body containing the necessary axes for performing the desired movement, with the head of the machine being controlled by software. This head contains a spindle presenting a tool-holder for securing the cutting tool.

The axes are moved by stepping motors or by servomotors located at one of the ends, and are in turn governed by numeric control and related software for the purpose. By means of the software the engraving that it is wished to produce is carried out and the orders are transmitted to the machine which will perform the engraving on the surface of the object.

In machines with three axes (X, Y, Z), or three degree of freedom, the X and Y axes correspond to longitudinal and transverse movements made by the head of the machine, while the Z axis corresponds to the depth of the line.

DESCRIPTION OF THE INVENTION

In general terms, the numeric control engraving machine forming the inventive object, as with others of its type, presents a bedframe on which it can slide, duly guiding a tool-holder turret, with the head having three degrees of freedom or being provided with three axes in which it can move.

So, the basic characteristic of the invention is focused on the fact that, as well as these three degrees of freedom, two new axes are included which we will call PT and SV, which permit a type of engraving to be obtained of the kind that is produced by artisan engraving with a chisel, since it makes it possible to have both a trajectory that is curvilinear in depth for the cutting of the material as well as others that are composed of straight lines or which are mixed.

The typographical characters and/or drawings it is wished to engrave are represented by vectors or their mathematical definition, in this way indicating the position and length of them, as well as the direction in which they are engraved, and with this data the axes can move in order to perform the programmed work.

The movements in the X and Y plane will not be described here since they are already known, though they will be used for engraving the plane geometry of the drawing in the usual way.

The PT (depth of line) axis is a new axis that will move in the vertical plane and will permit the chisel or cutting tool to become gradually embedded in the material as the tool advances tracing the geometry that is being engraved. This is done by means of its descent until it reaches the desired engraving depth and is then withdrawn in order to gradually remove the tool as far as the surface of the material and separate it from that material, at which point it will coincide with the end of the vector being engraved.

Simultaneously, and interpolated with the other axes, at the moment the tool bites into the material, the other axis, which we call SV (vector tracing), will orient the tool in such a way that it presents its cutting face or edge in the start-end direction of the vector, and it will go along tracing the geometry of it, turning the tool as required and in such a way that its cutting face is always in the direction that traces the vector being engraved. To do this, the tool will have the most appropriate means of positioning in the securing piece in the head of the machine.

This SV axis which rotates the spindle of the machine in order to orient the tool according to the sense of the vector that is being engraved will be able to be coupled to the spindle directly or indirectly in such a way that will also permit it to turn at the appropriate rate of revolutions when it is wished to use a traditional cutting tool, or to remain halted in the event that it is wished to use a diamond tool for works in which it is not wished to carry out the engraving with a chisel tool.

The fifth axis is a traditional Z axis, whether this be as a half-axis that can only drop down and rise as far a defined plane or a true axis for the third dimension permitting the shape of the piece in which the work is being done to be traced. The spindle of the machine can also be provided with a spring and nozzle system for tracing the surface of the material by sliding over it, for objects with an irregular surface.

The chisel tool that can be used for the numeric control machine has to have a reference guide in order to be able to align its approach or cutting plane with the origin or zero position of the SV axis, in such a way that when the machine is initialised its position is known and it can be oriented in the manner described above.

With regard to the shape of the cutting part of the tool, it can be sharpened in different ways: in the form of a triangle, rounded, trapezoidal, etc., depending on the type of line it is wished to achieve in the engraving.

In order to achieve the downward/upward movement described by the three-dimensional curve traced by the interpolation of the axes when reproducing each vector, the machining program has to consider the assignment of a value for the movement of the PT axis, duly set in such a way that the load exerted on the tool is not exceeded and will permit the latter to cut the material cleanly, maintaining a proportion between the depth and length of the vector that is being engraved. In the event of wishing to achieve greater depths, this will be able to be reached with successive passes performed by incrementing that depth with each pass.

In this way, it would be possible to engrave typographies of the kind known as True Type, converted into curves, or vector graphics of any kind. Moreover, specific typographies for this engraving system will be able to be designed, which will allow the possibilities of the machine to be exploited to the utmost.

These specially designed typographies will be three-dimensional and, as well as travel in the X and Y plane, they will also incorporate the downward/upward travels of the vectors which they comprise, each of them being a three-dimensional curve for achieving optimum control of the tool in the engraving process.

In order to facilitate an understanding of the characteristics of the invention and forming an integral part of this specification. some sheets of drawings are attached containing figures which, in an illustrative rather than limiting basis, the following has been represented.

DESCRIPTION OF THE PREFERRED FORM OF EMBODIMENT

Figure 1:
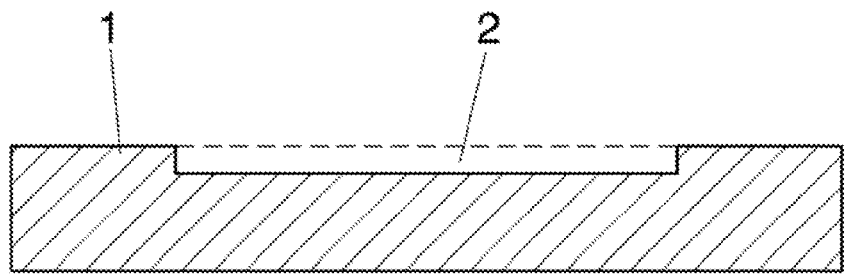
FIG. 1.—Is an example of engraving a line with a straight trajectory, produced with present-day machines.

Making reference to the numbering adopted in the figures and in particular to FIG. 1, we can see a piece 1 which has been engraved according to a straight trajectory 2, as is done by present-day machines, having a constant depth throughout its length. It does not, therefore, have the effect of engraving with a chisel as is sought with the invention.

Figure 2A:
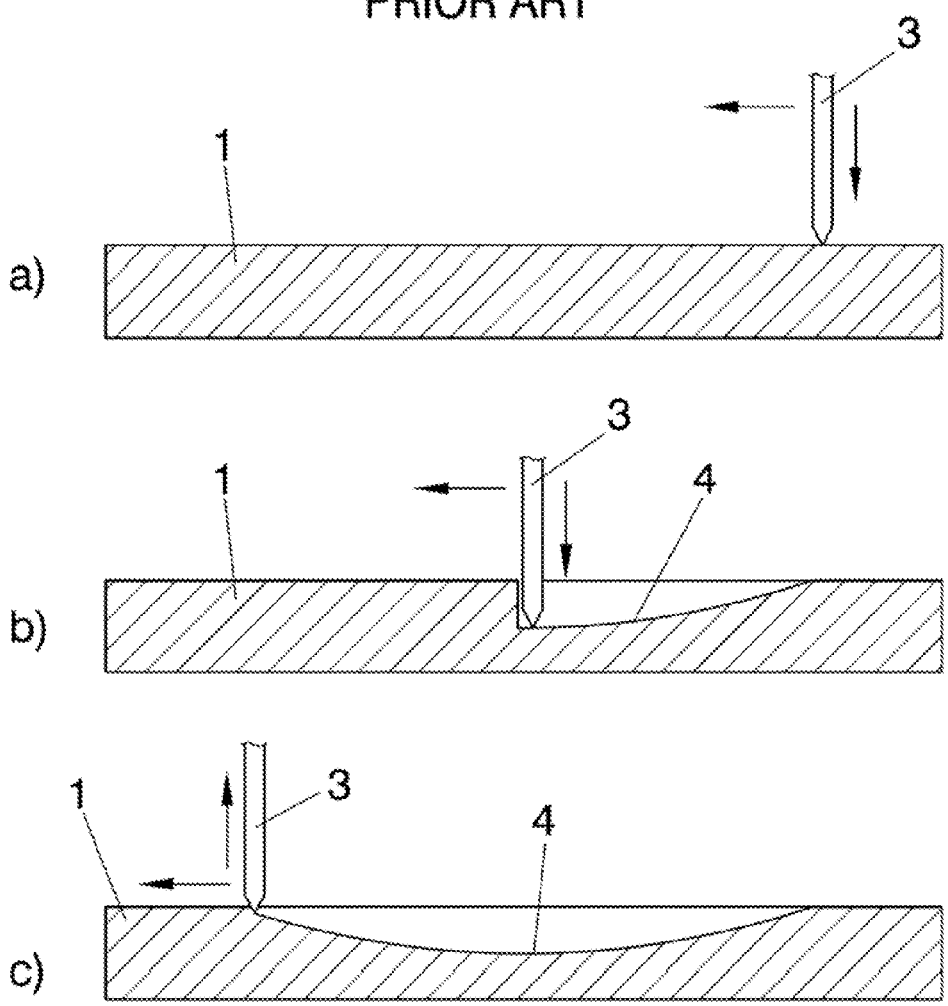
FIG. 2*a*.—Shows in three sequential positions the engraving of a straight line with a trajectory that is curvilinear in its depth obtained with the inventive engraving machine.

In FIG. 2*a* can be seen, in three positions a), b) and c), respective phases of engraving of a tool 3 with a straight line of curvilinear and symmetric depth 4, made in the piece 1. In position a) the engraving of the vector starts, with the tool 3 advancing in the direction of the vector and at the same time the penetration is produced for achieving the curvilinear bottom of the line, as far as its maximum depth at which point the advance continues and the tool 3 is progressively withdrawn, as seen position b). In position c) the tool 3 has now reached the end of the engraved vector.

Figure 2B:
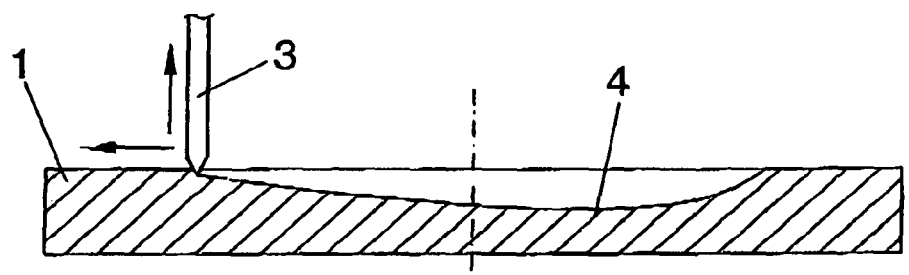
FIGS. 2*b*, 2*c* and 2*d*.—Are examples of engraving a straight line with different trajectories of incision in depth, according to the invention.
Figure 2C:
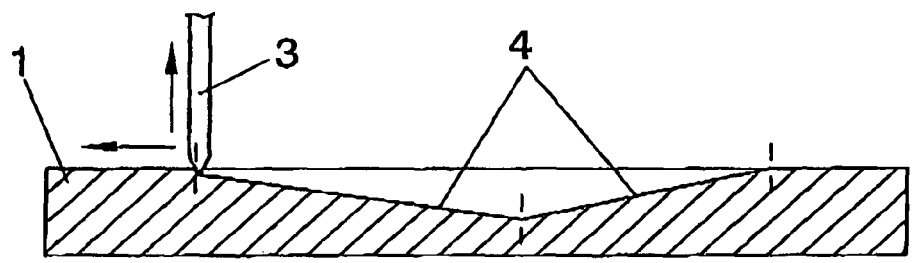
Figure 2D:
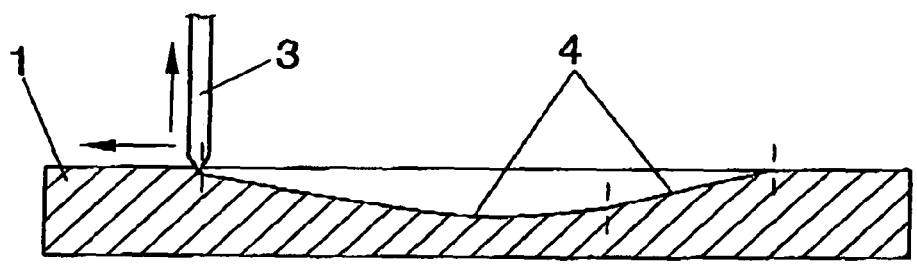

FIG. 2*b* shows an engraving of a trajectory that is curvilinear in depth and in which the point of maximum depth does not coincide with the midpoint of the line. The profile of the traced vector can be broken or polygonal (FIG. 2*c*), or mixed as can be seen in FIG. 2*d*.

Figure 3:
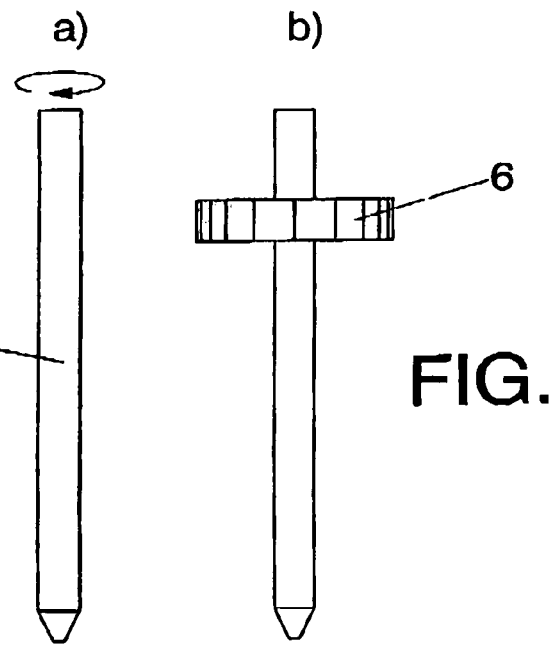
FIG. 3.—Is a diagrammatic view of a conventional tool that can be freely mounted on the securing piece of the tool-holder head, according to position b) of this figure.

FIG. 3, position a), shows in diagrammatic form a tool 5 that can be freely mounted in any position in the securing piece 6 for the head of the engraving machine, and can be directed in any way.

Figure 4:
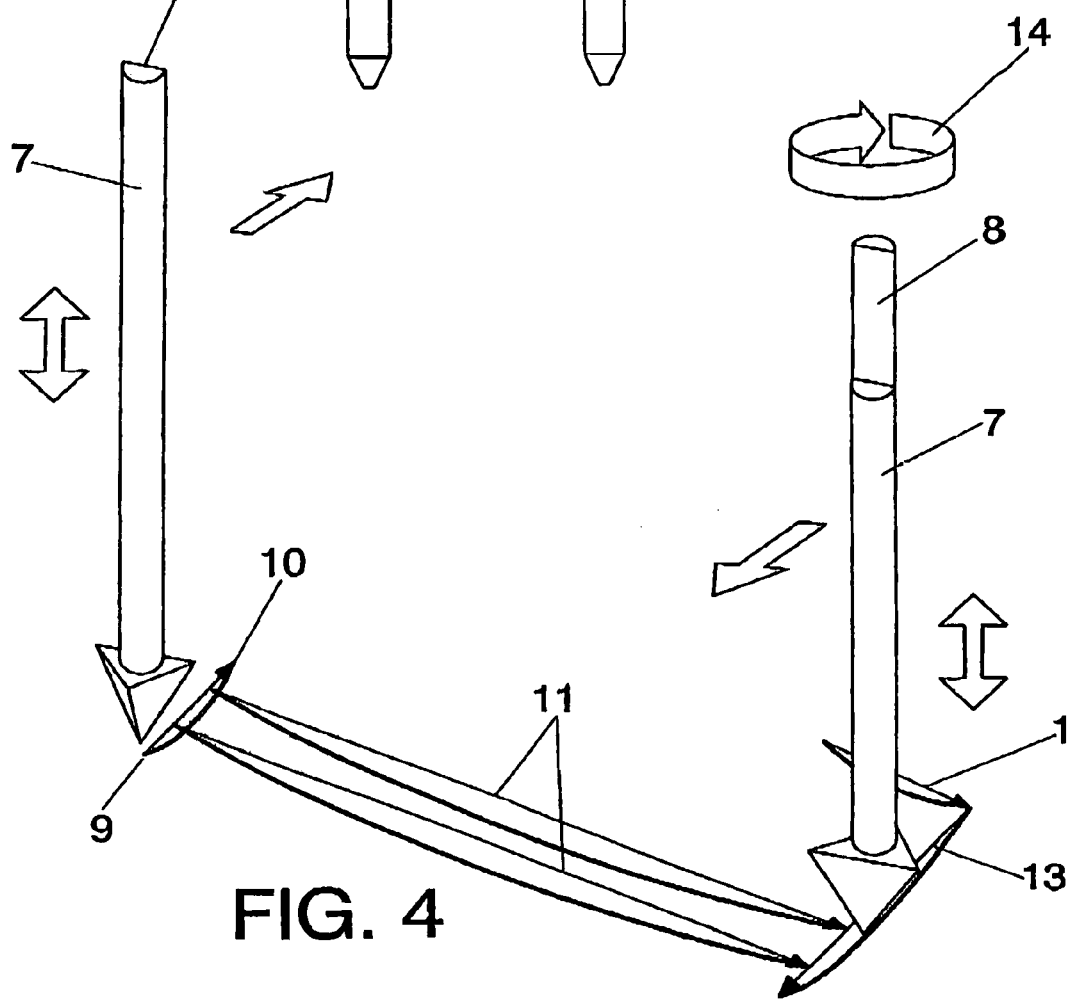
FIG. 4.—Is a diagrammatic view in perspective of the travel of the tool for making engraving with a trajectory that is curvilinear in depth, according to the invention, according to the different vectors of the line.

FIG. 4 shows a special tool 7 used to achieve the type of engraving according to the invention, the top of which, in other words its connecting end to the securing piece 6 in the head of the machine, has, in this example of embodiment, a mill 8 that marks the correct initial position for properly approaching the piece 1 to engrave, in the direction of the vector. Shown on the left of the FIG. 4 is a line according to a vector that starts at the point of origin 9 and ends at the arrow-head 10. From this vector, two others of greater length, referenced with 11, start and it can be seen that they present a straight line of curvilinear depth according to the invention. In the right-hand part of this FIG. 4 it can be seen how the engraving also includes another two vectors 12 and 13.

The tool 7 of this FIG. 4 has a different orientation depending on the sense of the vector whose line is being executed. The direction of rotation is marked with the curvilinear arrow 14.

Figure 5A:
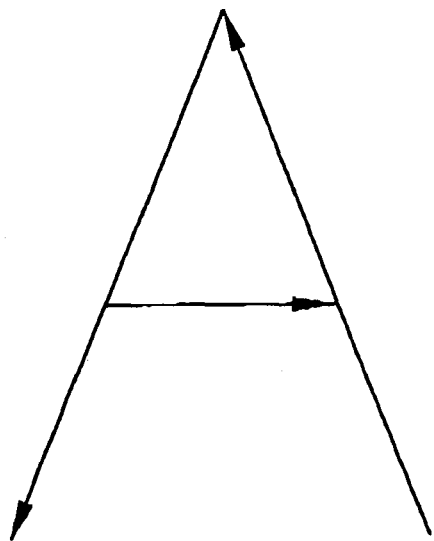
FIG. 5*a*.—Is a diagram of the engraving according to the invention, of a letter "A" with straight lines according to three vectors making up its outline.

In FIG. 5*a* it can be seen how, in order to engrave the letter "A", three vectors will be made and it is necessary to change the orientation of the tool in order to carry them out.

Figure 5B:
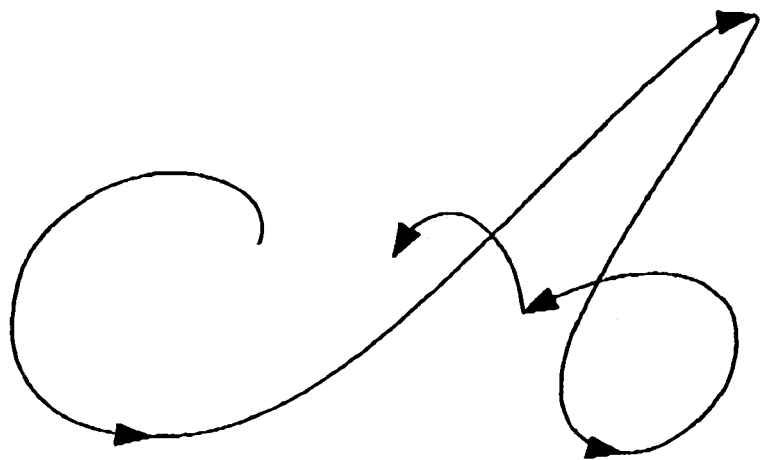
FIG. 5*b*.—Is a diagram of the engraving according to the invention, of a letter "A" with arched strokes, formed from five vectors.

FIG. 5*b* shows the engraving of an italic "A" by means of five arched vector lines.

Figure 6:
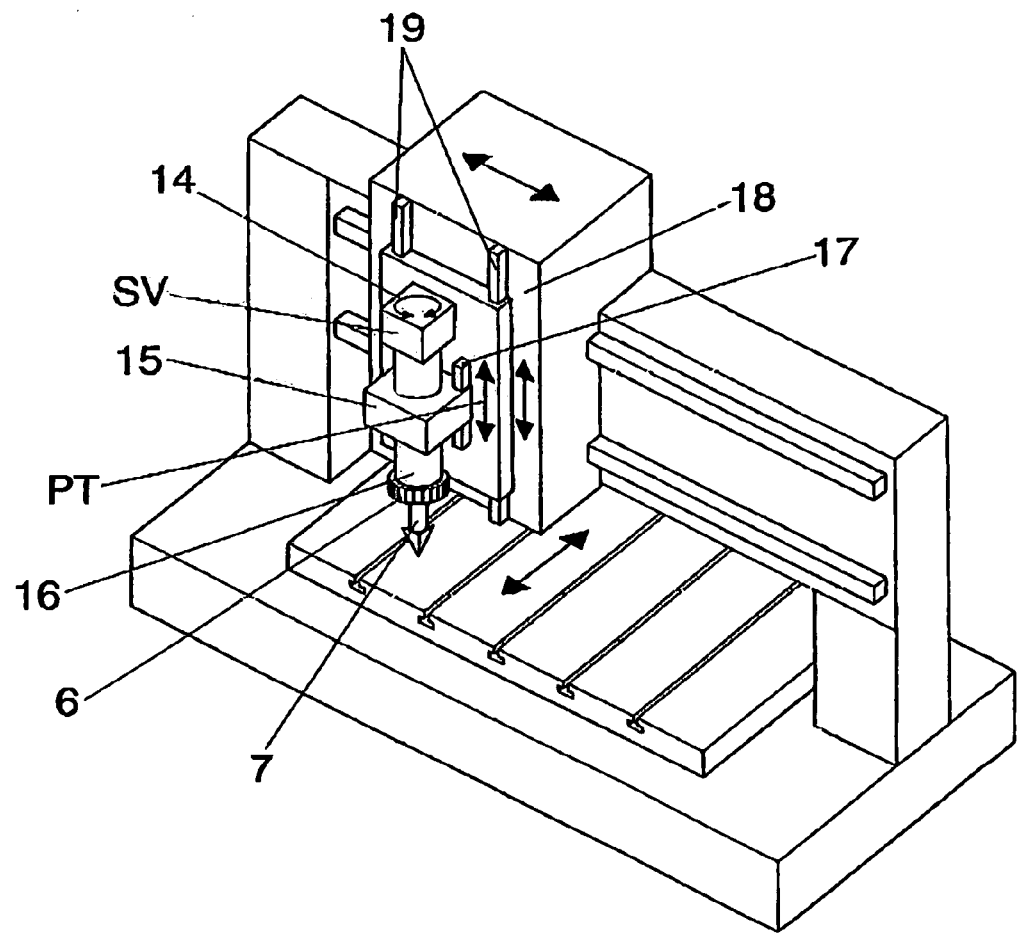
FIG. 6.—Is a diagrammatic view in perspective of a numeric control engraving machine, according to the invention in which the arrows indicate the directions of the different axes or degrees of freedom of the head.

In FIG. 6 a diagrammatic view can be seen of the numeric control engraving machine, according to the invention, in which two new axes have been created complementary to those already existing, which will permit the effect to be obtained of artisan engraving with a chisel, this being an effect that cannot be achieved with present-day machines. One of the two new axes defined above as PT (depth of line) is able to vary the penetration of the tool 7 by means of the block 15 linked to the tool-holder spindle 16, which is vertically displaced in the guides 17. The other axis which we have referred to as SV (vector tracing) allows rotation of the spindle in order to orient the tool 7, as shown by the annular arrow 14.

The vertical displacement of the tool 7 for progressive penetration as far as reaching the maximum depth and its withdrawal until it reaches the end of that line is independent of the vertical movement which the head can have according to the "Z" axis which is achieved by displacement of the block 18 in the guides 19.

The reason why the SV axis has been incorporated is because just one of the faces forming the active tip of the tool 7 will be cutting and it will keep that cutting face pointing in the sense of the vector.

With the engraving machine proposed by the invention, it will be possible to engrave typographies of the kind True Type (Microsoft), Portscript (Adobe), figures of any kind (vector graphics), and even design specific typographies for this new engraving system.

The invention claimed is:

1. A numeric control engraving machine, having application to the engraving of objects and surfaces, comprising a tool-holder head assisted with movements in the three axes X, Y and Z which define the three degrees of freedom governed by numeric control, wherein said tool-holder head is furthermore assisted by another two movements in two new axes PT and SV or degrees of freedom likewise governed by numeric control and respectively defined by a progressive advance of penetration and subsequent withdrawal of the tool at the moment of engraving, in each section of the line, this being the PT axis; and by an orienting rotation of the tool during the trajectory in each section of the line performing a tracing of the vector that defines the direction and sense of the line in order at all times to maintain the angle of approach, this being the SV axis; thus permitting artisan engraving with a chisel to be produced.

2. The machine of claim 1, wherein the axes or degrees of freedom are moved by stepping motors or servomotors.

3. The machine of claim 2, wherein the motors are governed by numeric control and related programmes for that effect.

4. The machine of claim 1, wherein the movement of the PT axis is achieved by means of a block linked to the spindle of the head which is vertically displaced in guides different from those permitting the vertical displacement along the Z axis.

5. The machine of claim 1, wherein the SV axis is coupled directly or indirectly to the spindle of the head of the machine.

6. The machine of claim 5, wherein the motor of the spindle rotates at a suitable rate of revolutions when a traditional cutting tool is used.

7. The machine of claim 5, wherein the motor of the spindle remains halted when a diamond tool is used for works in which engraving with a chisel effect is not being carried out.

8. The machine of claim 1, wherein the chisel tool includes means of positioning in the tool-holder or head, in order to be able to align its cutting plane with the origin or zero position of the SV axis being oriented during the work.

9. The machine of claim 8, wherein the means of positioning are defined by a mill at the end for securing to the tool-holder.

* * * * *